US010504677B1

(12) United States Patent
Sorenson

(10) Patent No.: US 10,504,677 B1
(45) Date of Patent: Dec. 10, 2019

(54) ELECTRONIC CIRCUIT BREAKER WITH PHYSICAL OPEN-CONTACT CONSTRUCTION AND FAIL-SAFE PROTECTION WITH DISABLING FEATURE

(71) Applicant: Richard W. Sorenson, Ft. Lauderdale, FL (US)

(72) Inventor: Richard W. Sorenson, Ft. Lauderdale, FL (US)

( * ) Notice: Subject to any disclaimer, the term of this patent is extended or adjusted under 35 U.S.C. 154(b) by 0 days.

(21) Appl. No.: 16/281,560

(22) Filed: Feb. 21, 2019

(51) Int. Cl.
*H01H 71/12* (2006.01)
*H01H 71/50* (2006.01)
*H01H 71/24* (2006.01)

(52) U.S. Cl.
CPC ...... *H01H 71/128* (2013.01); *H01H 71/2481* (2013.01); *H01H 71/50* (2013.01); *H01H 2205/002* (2013.01)

(58) Field of Classification Search
CPC .. H01H 71/128; H01H 71/2481; H01H 71/50; H01H 2205/002
See application file for complete search history.

(56) References Cited

U.S. PATENT DOCUMENTS

| 4,105,965 | A | 8/1978 | Russell |
| 4,266,259 | A | 5/1981 | Howell |
| 4,308,511 | A | 12/1981 | Borona |
| 4,331,999 | A | 5/1982 | Engel et al. |
| 4,338,647 | A | 7/1982 | Wilson et al. |
| 5,388,022 | A | 2/1995 | Ahuja |
| 5,886,860 | A | 3/1999 | Chen et al. |
| 6,157,529 | A | 12/2000 | Ahuja |
| 6,212,049 | B1 | 4/2001 | Spencer et al. |
| 6,671,144 | B1 | 12/2003 | Langford et al. |
| 6,831,819 | B2 | 12/2004 | Nemir et al. |
| 2009/0109589 | A1 | 4/2009 | Yoo et al. |

(Continued)

FOREIGN PATENT DOCUMENTS

WO   WO1986002786   5/1986

OTHER PUBLICATIONS

Mesut Baran, "Collaborative Protection and Control Schemes for Shipboard Electrical Systems", Mar. 26, 2007, Office of Naval Research Regional Office, Atlanta, GA.

(Continued)

*Primary Examiner* — Mohamad A Musleh
(74) *Attorney, Agent, or Firm* — Forge IP, PLLC

(57) ABSTRACT

A circuit breaker includes contacts movable between a closed position wherein a line terminal and a load terminal are in electrical communication, and an open position wherein the line and the load terminals are electrically isolated. A primary trip coil and a secondary trip coil are connected to the contacts, each causing the contacts to move from the closed position to the open position when activated, thereby tripping the breaker. A monitoring circuit, upon a determination being made that the breaker is not operating within acceptable trip parameters, causes activation of the primary coil, and, upon a determination being made that the breaker is not operating within acceptable disable parameters, causes activation of the secondary coil. The breaker is user resettable if the breaker has been tripped by the primary trip coil, but is not user resettable if the breaker has been tripped by the secondary trip coil.

24 Claims, 6 Drawing Sheets

(56) References Cited

U.S. PATENT DOCUMENTS

| | | | | |
|---|---|---|---|---|
| 2009/0184787 A1* | 7/2009 | Weeks | ................... | H01H 71/02 |
| | | | | 335/18 |
| 2013/0241675 A1* | 9/2013 | Simonin | ................ | H01H 50/44 |
| | | | | 335/6 |
| 2015/0200533 A1* | 7/2015 | Simonin | .................. | H02H 3/05 |
| | | | | 335/17 |

OTHER PUBLICATIONS

Emil Anthonsen Dyrstad, "Relay Lab at NTNU", Master's thesis submitted to Norwegian University of Science and Technology; Jun. 30, 2014.

Hataway, et al, "Improving Breaker Failure Protection for Generator Applications", Dec. 31, 2011, Power South Energy Cooperative and Schweitzer Engineering Laboratories, Inc.

* cited by examiner

ELECTRONIC CIRCUIT BREAKER WITH PHYSICAL OPEN-CONTACT CONSTRUCTION AND FAIL-SAFE PROTECTION WITH DISABLING FEATURE

FIELD OF THE INVENTION

The present invention is directed to an electronically controlled circuit breaker that incorporates a mechanical contact mechanism while maximizing the fail-safe level of the breaker to insure its ability to provide the required circuit protection.

BACKGROUND OF THE INVENTION

Traditional circuit breakers employ electro-mechanical means to provide protection against current overload and inrush. Similarly, circuit breakers employing electronic circuits to detect and trip the breakers when ground faults and/or arc faults are detected also generally incorporate an electro-mechanical means to provide protection against current overload and inrush. In these circuit breakers the electronics generally do not provide monitoring or protective control of the breaker in regard to current overload or inrush. Thus, should the electronic circuitry protecting against ground fault and/or arc fault fail, the breaker will still maintain its protection against overload and excessive inrush current.

Ideally, such a circuit breaker would also be able to employ electronic circuitry, either solely or combined with ground-fault and/or arc fault protection, to monitor current overload and inrush current and thereby trip the breaker should either be excessive. The electronics therein would be able to be exactingly programmed to provide precise protection against overload and inrush current. The problem with only employing electronic circuitry to provide a breaker's protective capability has been that, should the electronic circuitry fail, the breaker could remain in an "on" (connected) status during an overload, resulting in a dangerous, unacceptable condition.

An electro-mechanical circuit breaker that employs either thermal bi-metal construction, or hydraulic-magnetic construction, to provide current overload and inrush protection, is not completely failure proof, but is designed to be as failure proof as possible. Thus, any design of an electronically controlled circuit breaker would necessitate a similar degree of failure proof construction as inherent within traditional electro-mechanical circuit breaker designs.

Safety becomes a major factor in any employment of electronic circuit breakers that rely totally on solid-state microprocessor controlled electronics to provide protection without the incorporation of a physical contact opening during a trip (i.e., off) state. Also, existing technology for circuit protection that solely employs solid-state microprocessor controlled electronics to switch high voltage power incurs high cost and significant heat dissipation problems. The most practical and safe approach is to combine microprocessor based electronics to monitor the desired circuit protection parameters with a mechanical contact mechanism that would provide a physical contact gap in the open (i.e., off) position.

Historical attempts have been made to provide electronic circuit breakers that rely totally on solid-state microprocessor controlled electronics to provide protection against current overload and inrush current in addition to ground-fault and/or arc fault protection. However, none of these historical attempts has resulted in a circuit breaker design that provides a similar degree of failure proof construction as inherent within traditional electro-mechanical circuit breaker designs.

For example, U.S. Pat. No. 4,331,999 to Engel et al. and U.S. Pat. No. 4,338,647 to Wilson et al. disclose circuit interrupters with a digital control unit (154) that causes tripping of a trip coil (22) in response to various sensed conditions. However, both references discuss the use of a switching field effect transistor (192) to control the flow of current through the trip coil (22) in response to signals from the digital control unit (154). As such, in the case of failure within the digital control unit (154) and/or the transistor (192), the transistor (192) may be stuck in the unenergized state, thereby rendering the trip coil (22) inoperative, resulting in a potentially dangerous condition.

As such, there remained an unmet need in the industry for an electronically controlled circuit breaker that incorporates a mechanical contact mechanism while maximizing the fail-safe level of the breaker to insure its ability to provide the required circuit protection.

Many of these concerns have been addressed in my currently co-pending U.S. patent application Ser. Nos. 15/959,882 and 16/113,534, both entitled "Electronic Circuit Breaker With Physical Open-Contact Construction and Fail Safe Protection."

In order to remedy the deficiencies of previous designs, these applications disclose various embodiments of a circuit breaker that includes a normally closed relay having a relay activating circuit and a switching circuit, with the switching circuit being electrically connected to a trip coil. A monitoring circuit is electrically connected to the relay activating circuit, supplying activating power to the relay activating circuit so long as a determination is made that the breaker is operating within acceptable parameters, and ceasing to supply activating power to the relay activating circuit upon a determination being made that the breaker is not operating within acceptable parameters, thereby tripping the breaker.

However, one issue not specifically addressed in these applications relates to situations where the trip coil and/or the electronic monitoring circuit might become damaged, for example, in the case of an extremely high voltage surge. In these types of situations, it is conceivable that the damage may prevent proper functioning of the breaker (i.e., opening of the contacts), and consequently, it is possible for power to unintentionally be allowed to flow through the breaker if the breaker is reset. However, power flowing through a damaged circuit breaker may be problematic, and indeed potentially catastrophic. It would thus be desirable for a damaged circuit breaker to be permanently disabled such that power could not unintentionally flow therethrough regardless of how many attempts may be made to reset the breaker.

SUMMARY OF THE INVENTION

In general terms, the present invention provides for an electronically programmable circuit breaker with a protection configuration to render the breaker inoperable should there be a failure in the electronic monitoring circuitry and/or in a primary trip coil, thereby providing an enhanced level of protection against failure and potential loss of protection for attached equipment and danger to potentially exposed personnel.

More specifically, the present invention is directed to a circuit breaker configuration that incorporates two trip coil solenoids. One solenoid functions as the primary trip solenoid to trip the circuit breaker when powered by the electronic monitoring circuit as a result of any fault condition as monitored by the monitoring circuit. A secondary solenoid is dedicated to tripping and turning off the breaker, rendering it completely and permanently inoperable, in the event of a failure of the electronic monitoring circuit, or alternatively, in the event of the primary trip solenoid becoming inoperable, as monitored and determined by the electronic monitoring circuit.

The employment of a secondary trip coil, dedicated solely to the permanent disabling of the breaker, enables a significant increase in the breaker's level of fail-safe operation. As the permanent, secondary trip coil, if ever activated, would only experience a one-time, extremely short, burst of current, it is able to be constructed to absorb and withstand a much higher level of power than the breaker's primary trip coil. As a result, the permanent, secondary trip coil would thereby be highly resistant to potentially damaging voltage spikes, such as may occur during powerline surges, possibly as a result of lightning discharges.

Additionally, should the power feed to the breaker experience an extremely high voltage surge with a very high probability of damaging the breaker's electronic monitoring circuit, the surge would also act to permanently disable the breaker by activation of the permanent, secondary trip coil/solenoid.

The electronic circuit breaker may employ a relay circuit, either electro-mechanical or solid state, in a configuration that would render the breaker inoperable should either the electronic protection circuitry, or the relay itself, fail.

The breaker may employ, as the primary trip coil, a simple, inexpensive, magnetic coil solenoid device to activate the breaker's trip function, and may incorporate an electronic control circuit that is programmed with the desired circuit breaker trip parameters, to include overload trip rating and, if provided, inrush current time delay. The electronic control circuitry may include additional protection capabilities such as ground fault and/or arc fault, as desired.

The breaker may also incorporate a normally closed relay with the breaker's permanent, secondary trip coil connected to the output of the relay's normally closed (i.e., on) switching circuit. The power feed to the breaker may be connected both to the breaker's main output circuit, and also to a switch internal to the breaker that will be turned to its closed (i.e., on) state as the breaker is actuated to provide power to the electronic control circuitry. This internal switch may be actuated to its closed (i.e., on) state prior to the breaker's main output circuit being switched to its closed (i.e., on) state, and thus the electronic protection circuity may be activated prior to the breaker providing power to its connected load.

This electronic breaker design is appropriate for alternating current (AC) circuit protection applications, and also for direct current (DC) circuit protection applications when a physical contact gap is desired, as may be for safety and/or heat concerns.

A specific exemplary embodiment of a circuit breaker according to the present invention includes a pair of main contacts movable with respect to each other between a closed position wherein a line terminal and a load terminal are in electrical communication with each other via a main power circuit, and an open position wherein the line terminal and the load terminal are electrically isolated from each other. A primary trip coil is operably connected to at least one of the pair of main contacts, the primary trip coil causing the pair of main contacts to move from the closed position to the open position when activated, thereby tripping the circuit breaker. A secondary trip coil is also operably connected to at least one of the pair of main contacts, the secondary trip coil causing the pair of main contacts to move from the closed position to the open position when activated, thereby tripping the circuit breaker.

A monitoring circuit monitors operation of the circuit breaker. The monitoring circuit, upon a determination being made that the circuit breaker is not operating within acceptable trip parameters, causes activation of the primary trip coil, and the monitoring circuit, upon a determination being made that the circuit breaker is not operating within acceptable disable parameters, causes activation of the secondary trip coil. The circuit breaker is user resettable if the circuit breaker has been tripped by the primary trip coil, but the circuit breaker is not user resettable if the circuit breaker has been tripped by the secondary trip coil.

In some embodiments, the determination is made that the circuit breaker is not operating within acceptable trip parameters upon detection of at least one of the following: an inrush current above a threshold level and an overcurrent above a threshold level. In some embodiments, the determination is made that the circuit breaker is not operating within acceptable trip parameters upon detection of at least one of the following: a ground fault condition and an arc fault condition. In some embodiments, the determination is made that the circuit breaker is not operating within acceptable disable parameters upon detection of at least one of the following: a malfunction of the primary trip coil and a malfunction within the monitoring circuit.

In some embodiments, the secondary trip coil is activated in the event that the monitoring circuit becomes inoperable.

In some embodiments, the circuit breaker further includes a normally closed relay having a relay activating circuit and a switching circuit, the switching circuit defaulting to an on state, but being switchable to an off state when activating power is supplied to the relay activating circuit, the switching circuit automatically returning to the on state when activating power to the relay activating circuit is interrupted. The switching circuit of the normally closed relay is electrically connected to the secondary trip coil, such that the switching circuit of the normally closed relay provides power to the secondary trip coil when the switching circuit is in the on state, thereby causing activation of the secondary trip coil and tripping of the circuit breaker, but does not provide power to the secondary trip coil when the switching circuit is in the off state. The monitoring circuit is electrically connected to the relay activating circuit of the normally closed relay, the monitoring circuit supplying activating power to the relay activating circuit so long as a determination is made that the circuit breaker is operating within acceptable disable parameters, and ceasing to supply activating power to the relay activating circuit, thereby tripping the circuit breaker, when either (i) the monitoring circuit determines that the circuit breaker is not operating within the acceptable disable parameters, or (ii) the monitoring circuit becomes inoperable.

In certain of these embodiments, the monitoring circuit is electrically connected to the primary trip coil, and the monitoring circuit provides power to the primary trip coil when a determination is made that the circuit breaker is not operating within acceptable trip parameters, thereby causing activation of the primary trip coil and tripping of the circuit breaker.

In certain embodiments, an input of the switching circuit of the normally closed relay receives power from the main power circuit, downstream of the pair of main contacts, and an output of the switching circuit of the normally closed relay is electrically connected to the secondary trip coil. In certain of these embodiments, the secondary trip coil requires greater power to trip than the secondary trip coil momentarily experiences prior to the switching circuit of the normally-closed relay being switched to its open state when the breaker is either switched to its closed state or when the breaker is first provided power while it is already in an unpowered, closed state. In certain of these embodiments, the circuit breaker further includes a capacitive delay circuit electrically connected in the switching circuit of the normally closed relay.

In certain embodiments, the normally closed relay comprises a solid state normally closed relay and the relay activating circuit comprises a solid state activating circuit. In other embodiments, the normally closed relay comprises an electro-mechanical normally closed relay and the relay activating circuit comprises an activating coil.

In some embodiments, a sensor is electrically disposed in the main power circuit and the monitoring circuit is in electrical communication with the sensor.

In accordance with another exemplary embodiment of the present invention, a circuit breaker includes a pair of main contacts movable with respect to each other between a closed position wherein a line terminal and a load terminal are in electrical communication with each other via a main power circuit, and an open position wherein the line terminal and the load terminal are electrically isolated from each other. A primary trip coil is operably connected to at least one of the pair of main contacts, the primary trip coil being adapted, upon activation, to cause the pair of main contacts to move from the closed position to the open position, thereby tripping the circuit breaker. A secondary trip coil is operably connected to at least one of the pair of main contacts, the secondary trip coil being adapted, upon activation, to cause the pair of main contacts to move from the closed position to the open position, thereby tripping the circuit breaker.

A monitoring circuit monitors operation of the circuit breaker. The monitoring circuit is electrically connected to the primary trip coil such that the monitoring circuit provides power to the primary trip coil when a determination is made that the circuit breaker is not operating within acceptable trip parameters, thereby causing activation of the primary trip coil and tripping of the circuit breaker.

The circuit breaker also includes a normally closed relay having a relay activating circuit and a switching circuit, the switching circuit defaulting to an on state, but being switchable to an off state when activating power is supplied to the relay activating circuit, the switching circuit automatically returning to the on state when activating power to the relay activating circuit is interrupted. The switching circuit of the normally closed relay is electrically connected to the secondary trip coil, such that the switching circuit of the normally closed relay provides power to the secondary trip coil when the switching circuit is in the on state, thereby causing activation of the secondary trip coil and tripping of the circuit breaker, but does not provide power to the secondary trip coil when the switching circuit is in the off state. The monitoring circuit is electrically connected to the relay activating circuit of the normally closed relay, the monitoring circuit supplying activating power to the relay activating circuit so long as a determination is made that the circuit breaker is operating within acceptable disable parameters, and ceasing to supply activating power to the relay activating circuit, thereby tripping the circuit breaker, when either (i) the monitoring circuit determines that the circuit breaker is not operating within the acceptable disable parameters, or (ii) the monitoring circuit becomes inoperable.

In some embodiments, the circuit breaker is user resettable if the circuit breaker has been tripped by the primary trip coil, and the circuit breaker is not user resettable if the circuit breaker has been tripped by the secondary trip coil.

In some embodiments. an input of the switching circuit of the normally closed relay receives power from the main power circuit, downstream of the pair of main contacts, and an output of the switching circuit of the normally closed relay is electrically connected to the secondary trip coil. In certain of these embodiments, the secondary trip coil requires greater power to trip than the secondary trip coil momentarily experiences prior to the switching circuit of the normally-closed relay being switched to its open state when the breaker is either switched to its closed state or when the breaker is first provided power while it is already in an unpowered, closed state. In certain embodiments, a capacitive delay circuit is electrically connected in the switching circuit of the normally closed relay.

In some embodiments, a sensor is electrically disposed in the main power circuit and the monitoring circuit is in electrical communication with the sensor.

In some embodiments, the normally closed relay comprises a solid state normally closed relay and the relay activating circuit comprises a solid state activating circuit. In other embodiments, the normally closed relay comprises an electro-mechanical normally closed relay and the relay activating circuit comprises an activating coil.

In some embodiments, the determination is made that the circuit breaker is not operating within acceptable trip parameters upon detection of at least one of the following: an inrush current above a threshold level and an overcurrent above a threshold level. In some embodiments, the determination is made that the circuit breaker is not operating within acceptable trip parameters upon detection of at least one of the following: a ground fault condition and an arc fault condition. In some embodiments, the determination is made that the circuit breaker is not operating within acceptable disable parameters upon detection of at least one of the following: a malfunction of the primary trip coil and a malfunction within the monitoring circuit.

Other objects of the invention and its particular features and advantages will become more apparent from consideration of the following drawings and accompanying detailed description.

DETAILED DESCRIPTION OF THE INVENTION

Figure 1:
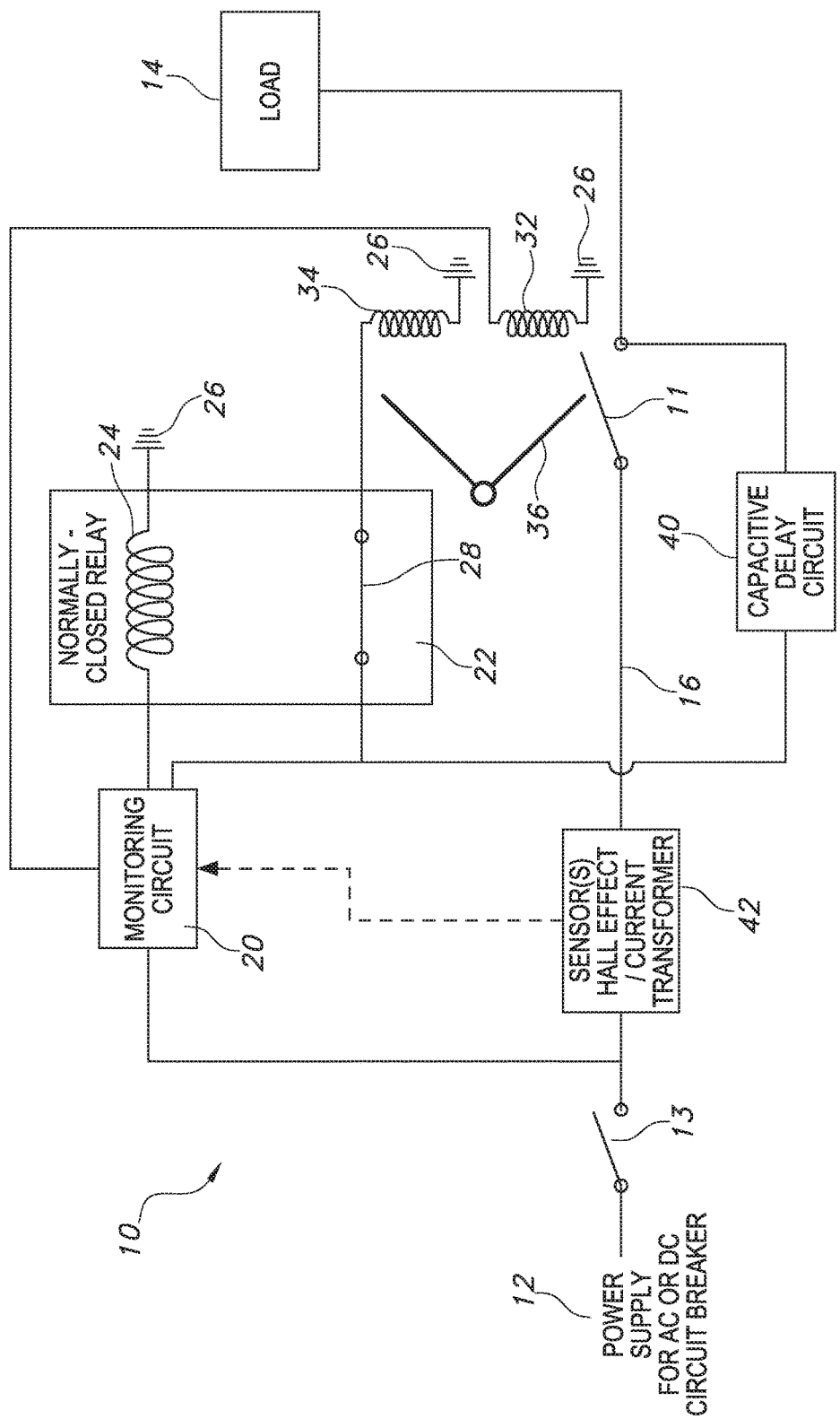
FIG. 1 is a schematic illustration of a circuit breaker with a protection configuration to render the breaker inoperable should there be a failure in the electronic monitoring circuitry and/or primary trip coil according to an exemplary embodiment of the present invention, shown in an unpowered state.
Figure 2:
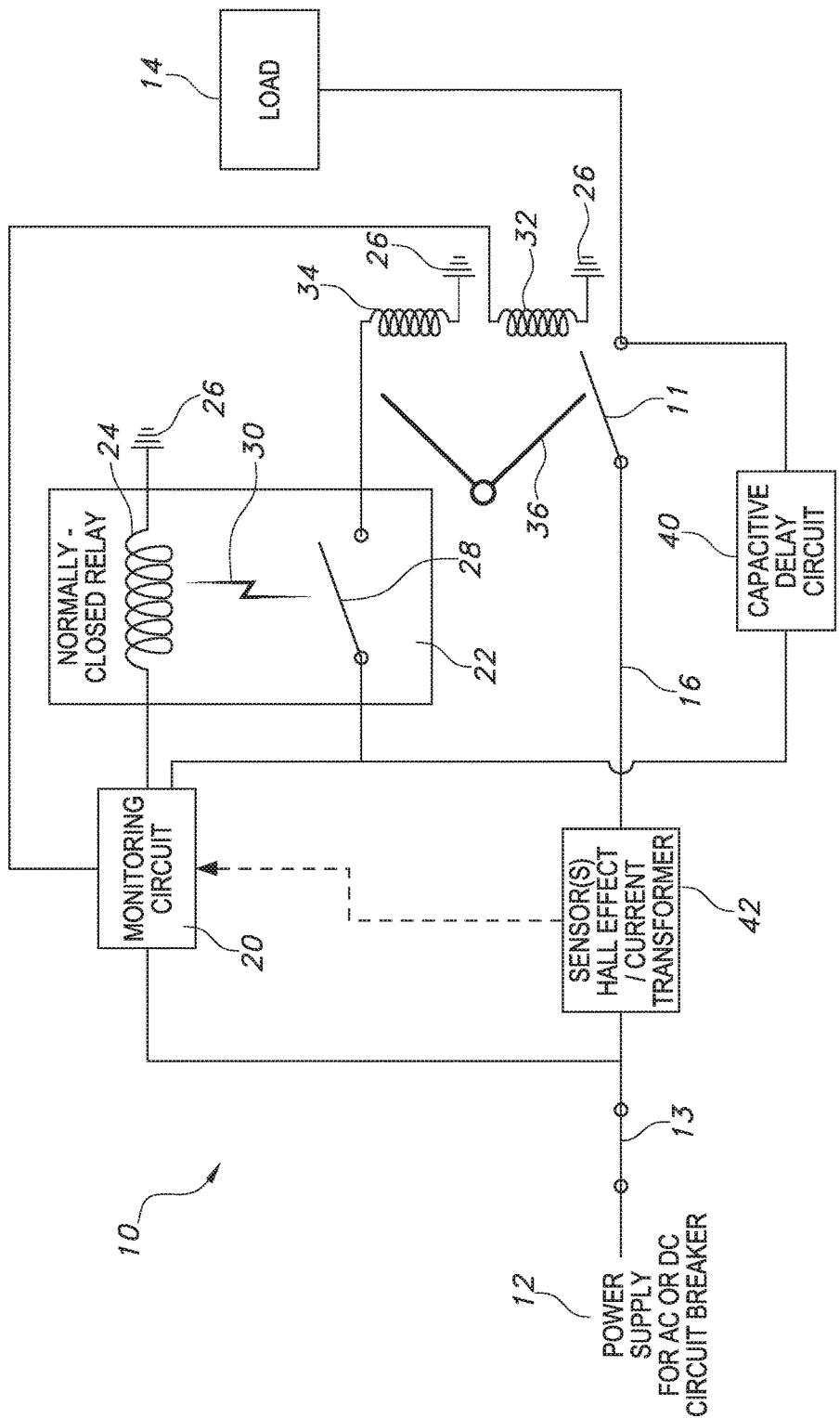
FIG. 2 is a schematic illustration of the circuit breaker of FIG. 1, shown in a state where power is being provided to the breaker while the breaker is in an off state, not feeding power to an attached load.
Figure 3:
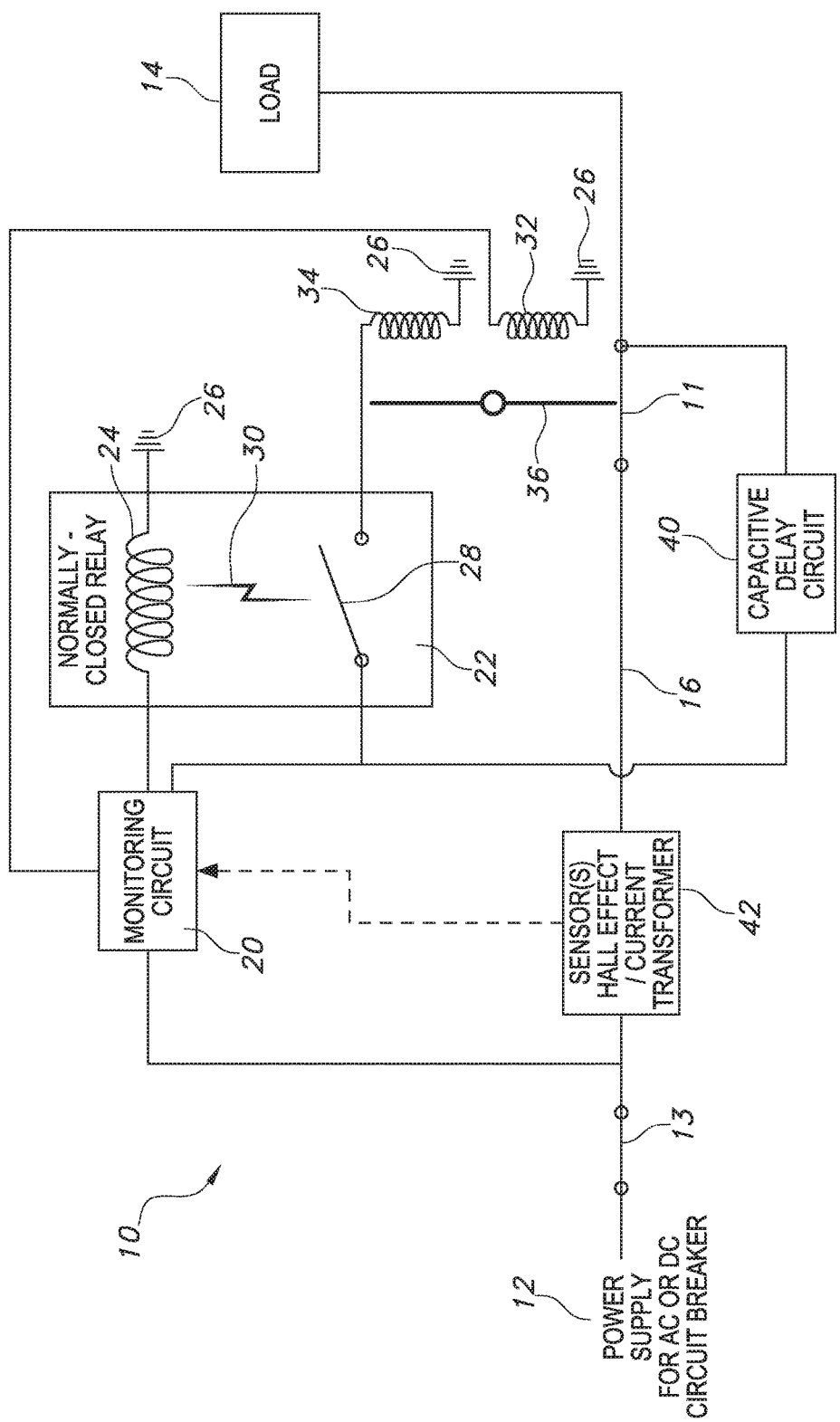
FIG. 3 is a schematic illustration of the circuit breaker of FIG. 1, shown in a state where power is being provided to the breaker while the breaker is in an on state, thus feeding power to an attached load.

Referring to the figures in detail and first to FIGS. 1-3, there is shown an exemplary embodiment of an electronically controlled circuit breaker (10) that incorporates a mechanical contact mechanism (11) while maximizing the fail-safe level of the breaker (10) to insure its ability to provide the required circuit protection.

The circuit breaker (10) is electrically connected to a power supply (12), which may be either alternating current (AC) or direct current (DC), via a line terminal that supplies power to a control switch/breaker (13), with the output of the control switch/breaker (13) being fed to both an electronic monitoring circuit (20) and, via a main power line (16), to the mechanical contact mechanism (11), which, in turn, feeds power to the load (14) when in a closed (i.e., on) state.

The circuit breaker (10) includes a relay (22), which may be of various types, such as a solid state relay or an electro-mechanical relay, so long as the relay is of the normally closed type, meaning that a switching circuit (28) of the relay (22) will stay in, or will return to, the closed (i.e., ON) state when less than threshold activating power is being supplied to an activating circuit/coil (24) of the relay (22). As will be recognized by those of ordinary skill in the art, this lack of threshold activating power (i.e., causing the switching circuit (28) to be closed) may be the result of an intentional removal of power to the activating circuit/coil (24), may be the result of a failure in the circuit upstream of the relay (such as a failure in the monitoring circuit (20)), may be the result of a failure in the activating circuit/coil (24) of the relay (22) itself, etc. However, whatever the cause, when threshold activating power is not supplied to the activating circuit/coil (24) of the relay (22), the switching circuit (28) of the relay (22) is closed (i.e., on), as shown in FIG. 1.

The electronic monitoring circuit (20) of the breaker (10) has an output to either the activating input of the solid state relay circuit, or the coil of the electro-mechanical relay, depending upon which type of relay (22) is employed, which will, when energized (indicated at 30 in FIG. 2), result in the normally closed switching circuit (28) of the relay (22) being switched to the open (i.e., off) position (again, as shown in FIG. 2). Thus, under normal conditions, the output feed from the electronic monitoring circuit (20) provides threshold activating power to the activating circuit/coil (24) of the relay (22) (the other side of which is generally connected to an opposite polarity connection (26) to complete the circuit, enabling the powering of the relay coil or solid state relay circuit), with the result that the switching circuit (28) of the relay (22) will switch to its open (i.e., off) position and thus not provide power to the trip coil (34), thereby enabling the mechanical contacts (11) of the breaker (10) to be turned on (i.e., closed) normally, with the result being that power supply (12) is electrically connected to the load (14) via a load terminal electrically connected to the main power circuit (16) (as shown in FIG. 3).

As should be recognized, the control switch/breaker (13) may be omitted if desired, and the electronic monitoring circuit (20) may instead receive power directly from the power supply (12) supplying power to the line terminal. In this configuration, whenever power is supplied to the circuit breaker line terminal from power supply (12), the electronic monitoring circuit (20) would be powered on, and, should the electronic monitoring circuit (20) be operating properly, power would be supplied to the to the activating circuit/coil (24) of the normally closed relay (22), switching the switching circuit (28) of the relay (22) to its open (i.e., off) state. The normally closed relay (22) would thereby remain in its off state while the breaker (10) is in its off state as long as power is being supplied to the line input of the breaker (10) and the electronic monitoring circuit (20) is operating properly. With the switching circuit (28) of the normally closed relay (22) being in its open (i.e., off) state, the breaker (10) would be able to be operated normally.

The electronic monitoring circuit (20) is programmed with the operating parameters desired for the breaker's application, such as current trip point, inrush capability, ground fault thresholds, arc fault thresholds, etc. Should any of these parameters not be met, the electronic monitoring circuit (20) causes tripping of the breaker.

This may be accomplished in various ways. In some cases, the monitoring circuit (20) may be electrically connected directly to the primary trip coil (32), such that if any of the programmed parameters are not met, the monitoring circuit (20) sends a trip current directly to the primary trip coil (32). In such cases, the normally closed relay (22) would function only as a failsafe in the event of a failure in the monitoring circuit (20) or some other component of the circuit breaker (10), with typical non-failure tripping (e.g., in the event of an overcurrent, ground fault, arc fault, etc.) not employing the normally closed relay (22). Such a configuration may be desirable to provide system redundancy.

Figure 5:
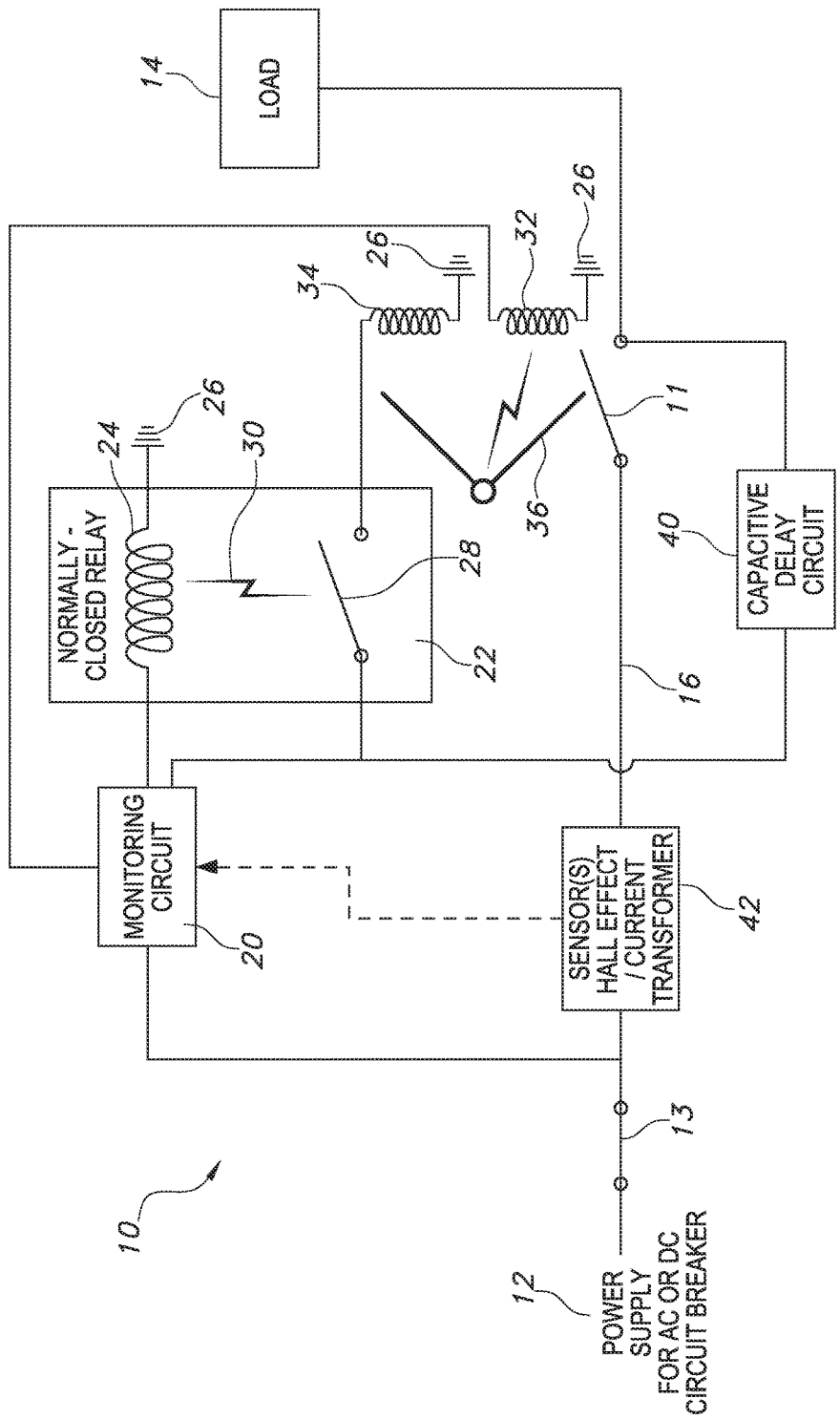
FIG. 5 is a schematic illustration of the circuit breaker of FIG. 1, shown in a state where the breaker in its normal tripped position as would occur subsequent to the determination of the existence of a fault condition.

Alternately, it may be desirable in some cases for the normally closed relay (22) to be employed both for typical non-failure tripping (e.g., in the event of an overcurrent, ground fault, arc fault, etc.) and for tripping in the case of a failure of the breaker (10). In such cases, if any of the programmed parameters are not met, the monitoring circuit (20) ceases sending activating power to the activating circuit/coil (24) of the normally closed relay (22), with the result that the switching circuit (28) of the relay (22) returns to its normally-closed (i.e., on) state, thus connecting power to the primary trip coil (32) and tripping the breaker (10) by opening the contacts (11) (as shown in FIG. 5).

If desired, a sensor (42) may be provided in the main power circuit (16), which may provide sensor data to the monitoring circuit (20) for use as part of evaluating whether the specified parameters are being satisfied. The sensor (42) may be, for example, a current transformer to aid in evaluating whether an overcurrent situation exists, or may be a ground fault and/or arc fault detecting circuit and/or coil. Various other sensors, such as Hall-effect sensors may also be provided, if desired, to aid the monitoring circuit (20) in evaluating the electrical current passing through the circuit breaker and/or the breaker itself.

As shown in the figures the output of the control switch/breaker (13) may feed power to the electronic monitoring circuit (20). However, it may also be possible for the electronic monitoring circuit (20), in addition to the switching circuit (28) of the normally closed relay (22), to be internally electrically connected to the main power circuit (16) in the vicinity of the output terminal of the breaker (10), i.e., downstream of the contacts (11). Appropriate inline surge protection, such as a capacitive delay circuit (40) may be provided, as needed, to inhibit unintended tripping, as is explained in more detail below.

Turning now specifically to FIG. 1, the circuit breaker (10) is in an unpowered state. No power is being provided to the breaker resulting in the normally closed relay (22) remaining in its closed, or on, position.

FIG. 2 shows the circuit breaker (10) with power being provided to the breaker (i.e., control switch/breaker (13) is turned on) while the breaker (10) is in an off state (i.e., contacts (11) are open), not feeding power to its attached load (14). In this state, the electronic monitoring circuit (20) is being powered and actively performing its monitoring functions. With it determining all functionality to be normal, it is feeding power to the activating circuit/coil (24) of the normally closed relay (22), with the result that the switching circuit (28) of the relay (22) is powered into its open (i.e., off) state.

FIG. 3 shows the circuit breaker (10) as having been switched to its on state with power thus being fed from the breaker (10) to its connected load (14). The trip link mechanism (36) of the circuit breaker (10) has been turned to its on position, such that the breaker contacts (11) are moved to their closed (i.e., on) state. As the electronic monitoring circuit (20) has powered the normally closed relay (22) into its open (i.e., state), no power from the closed breaker contacts (11) is being fed to the permanent trip coil/solenoid (34).

Figure 4:
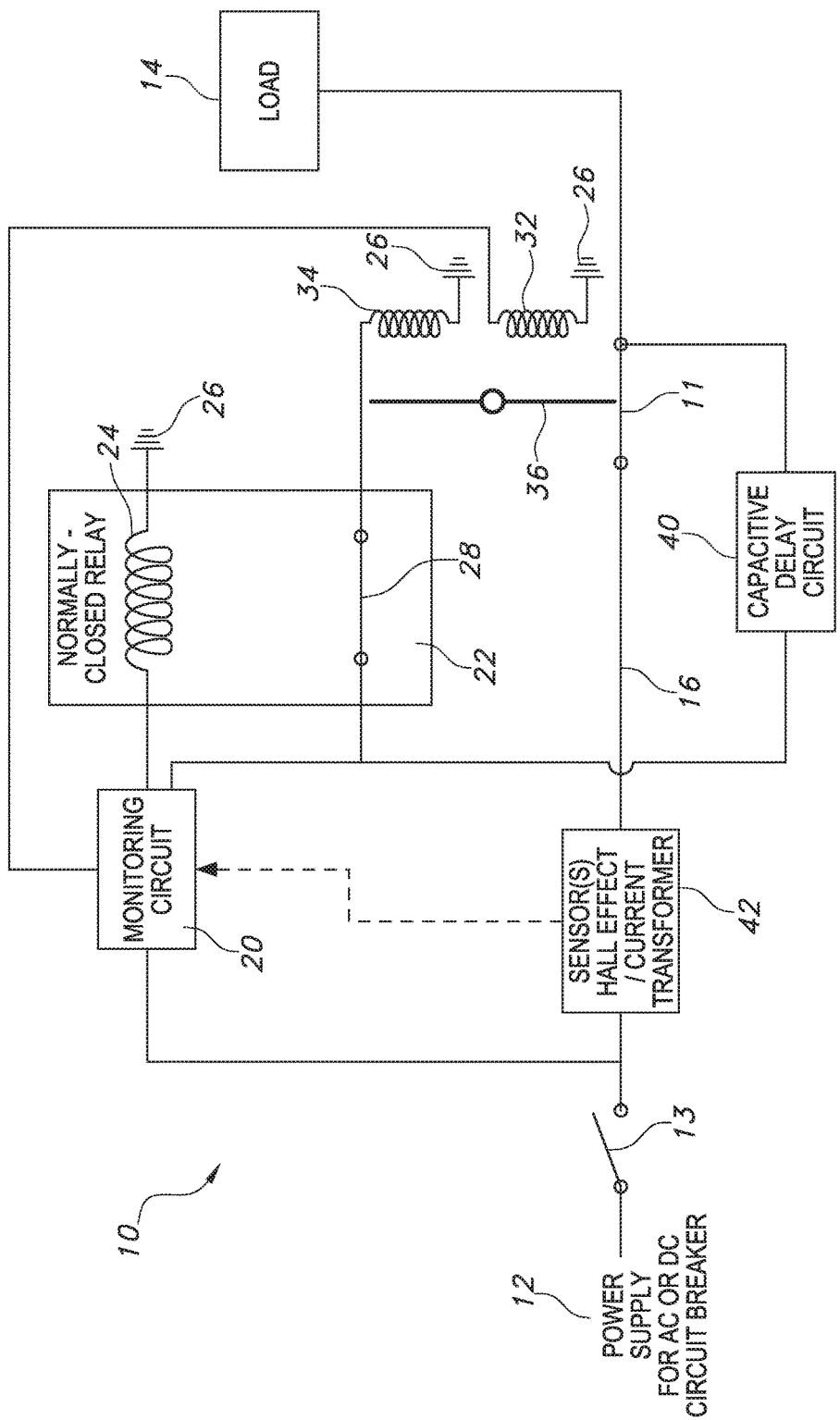
FIG. 4 is a schematic illustration of the circuit breaker of FIG. 1, shown in a state where the circuit breaker in its on position, but with the power being fed to the circuit breaker having been disconnected, or disrupted.

FIG. 4 shows the circuit breaker (10) in its on position but with the power being fed to the circuit breaker having been disconnected, or disrupted. This may occur from either the main power feed having been shut off, or from a power failure. In this case, no power is being furnished to the breaker (10), its electronic monitoring circuit (20), and its connected load (14), with the result being that the breaker's normally closed relay (22) would return to its on, or normally closed contacts, state. Should power subsequently be restored to the breaker, the capacitive delay circuit (40) will prevent enough power from being provided to activate the permanent trip coil/solenoid (34) until the electronic monitoring circuit (20) has been able to provide power to the normally closed relay (22) and activate it to its open, non-conducting, state. Thus, with power being restored, the breaker (10) will remain in its on state as depicted in FIG. 3.

FIG. 5 shows the breaker (20) in its normal tripped, off, state as would occur subsequent to the electronic monitoring circuit (20) determining the existence of a fault condition. In having determined the existence of a fault condition, the electronic monitoring circuit (20) will send power to the primary trip coil/solenoid (32) to cause it to trip the circuit breaker (10) by opening contacts (11). In this situation, the circuit breaker (10) may be reset, as is typical with tripped circuit breakers.

Figure 6:
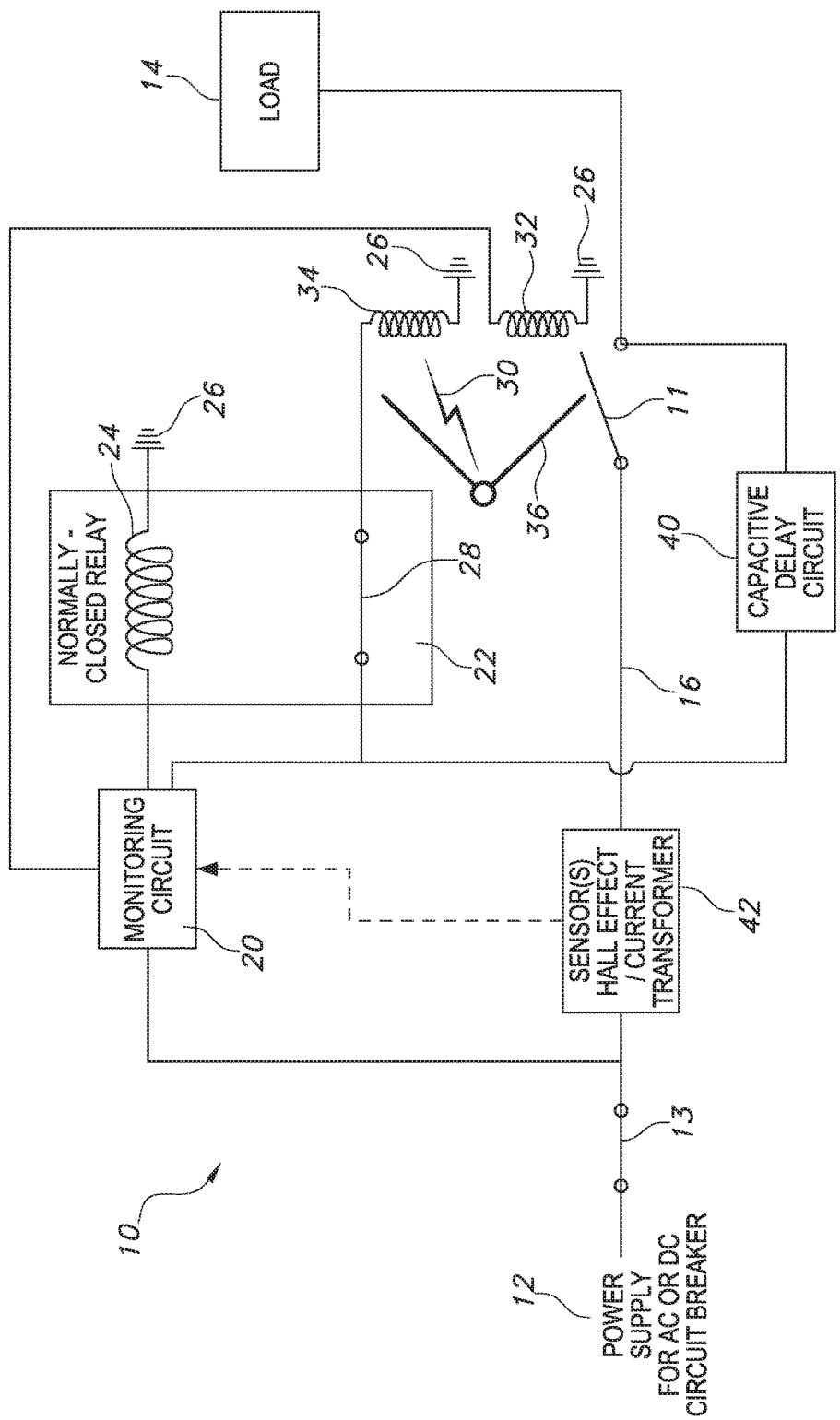
FIG. 6 is a schematic illustration of the circuit breaker of FIG. 1, shown in a state where the breaker has been caused to be placed in a permanently disabled off condition.

FIG. 6 shows the breaker (10) in a permanently disabled (i.e., off) state. The breaker (10) is rendered permanently off and disabled by the powering and activation of the permanent trip coil/solenoid (34). If such occurs, the breaker (10) is longer be operable and needs to be replaced. This result occurs as a result of the following conditions:

1) The electronic monitoring circuit (20) continually monitor the integrity of the primary trip coil/solenoid (32), and, should it determine the primary trip coil/solenoid (32) has become non-functional, the electronic monitoring circuit (20) ceases sending power to the normally closed relay (22), resulting in the relay's contacts returning to their normal closed (i.e., on) state, thereby sending power to and activating the permanent trip coil/solenoid (34).

2) The electronic monitoring circuit (20) continually self-tests, and, should it determine its protection capability has become impaired, the electronic monitoring circuit (20) is programmed to cease powering the normally closed relay (22), causing the relay's contacts to close and activate the permanent trip coil/solenoid (34).

3) Should the electronic monitoring circuit (20) become inoperable, it will not be able to feed power to the normally closed relay (22), resulting in the closing of the relay's contacts and the powering and activation of the permanent trip coil/solenoid (34).

Again, unlike the situation where the primary trip coil/solenoid (32) causes the circuit breaker (10) to trip by opening contacts (11), in which case the circuit breaker (10) may be reset, when the permanent trip coil/solenoid (34) causes the circuit breaker (10) to trip by opening contacts (11), the circuit breaker (10) is permanently disabled and may not be reset.

Although the invention has been described with reference to particular arrangement of parts, features, and the like, these are not intended to exhaust all possible arrangements or features, and indeed many modifications and variations will be ascertainable to those of skill in the art.

For example, while the embodiment discussed above employs a normally closed relay (22) to cause activation of the permanent trip coil/solenoid (34), other mechanisms may be employed which would allow the electronic monitoring circuit (20) to permanently disable the circuit breaker (10).

Additionally, various ancillary features may be provided as considered appropriate. For example, the breaker (10) may incorporate the capability (as may be enabled by Wi-Fi, Bluetooth, Zigbee, Z-Wave, and/or hard wiring to a central processor) to enable remote communication, thereby allowing remote monitoring, control, and/or programming.

If desired, the electronic circuit breaker (10) may be manufactured without the electronic control circuitry (20) being programmed for circuit protection. In this state, the breaker (10) could be stocked un-programmed by the manufacturer or a retailer. The circuit breaker's electronic control circuitry (20) would require a high-level security protection code to enable it to be programmed. A programming device could be provided that would enable selection of the desired circuit protection parameters, and, with the circuit breaker (10) properly connected to said device, the circuit breaker could be programmed with the desired protective parameters and labeled accordingly. This capability would tremendously reduce investment in inventory, as a single generic breaker would be able to be programmed to provide specific protection as selected from a large range of voltage and current ratings, inrush, ground-fault, arc-fault, and other protective attributes.

The present invention thus provides an electronically controlled circuit breaker that incorporates a mechanical contact mechanism while maximizing the fail-safe level of the breaker to insure its ability to provide the required circuit protection.

What is claimed is:

1. A circuit breaker comprising:
a pair of main contacts movable with respect to each other between a closed position wherein a line terminal and a load terminal are in electrical communication with each other via a main power circuit, and an open position wherein the line terminal and the load terminal are electrically isolated from each other;
a primary trip coil operably connected to at least one of said pair of main contacts, said primary trip coil causing said pair of main contacts to move from the closed position to the open position when activated, thereby tripping said circuit breaker;
a secondary trip coil operably connected to at least one of said pair of main contacts, said secondary trip coil causing said pair of main contacts to move from the closed position to the open position when activated, thereby tripping said circuit breaker;
a monitoring circuit monitoring operation of the circuit breaker;
said monitoring circuit, upon a determination being made that said circuit breaker is not operating within acceptable trip parameters, causing activation of said primary trip coil, and
said monitoring circuit, upon a determination being made that said circuit breaker is not operating within acceptable disable parameters, causing activation of said secondary trip coil;
wherein said circuit breaker is user resettable if the circuit breaker has been tripped by said primary trip coil; and
wherein said circuit breaker is not user resettable if the circuit breaker has been tripped by said secondary trip coil.

2. The circuit breaker of claim 1 wherein the determination is made that said circuit breaker is not operating within acceptable trip parameters upon detection of at least one of the following: an inrush current above a threshold level and an overcurrent above a threshold level.

3. The circuit breaker of claim 1 wherein the determination is made that said circuit breaker is not operating within acceptable trip parameters upon detection of at least one of the following: a ground fault condition and an arc fault condition.

4. The circuit breaker of claim 1 wherein the determination is made that said circuit breaker is not operating within acceptable disable parameters upon detection of at least one of the following: a malfunction of said primary trip coil and a malfunction within said monitoring circuit.

5. The circuit breaker of claim 1 wherein said secondary trip coil is activated in the event that said monitoring circuit becomes inoperable.

6. The circuit breaker of claim 1 further comprising:
a normally closed relay having a relay activating circuit and a switching circuit, the switching circuit defaulting to an on state, but being switchable to an off state when activating power is supplied to the relay activating circuit, the switching circuit automatically returning to the on state when activating power to the relay activating circuit is interrupted;
wherein the switching circuit of said normally closed relay is electrically connected to said secondary trip coil, such that the switching circuit of said normally closed relay provides power to said secondary trip coil when the switching circuit is in the on state, thereby causing activation of said secondary trip coil and tripping of the circuit breaker, but does not provide power to said secondary trip coil when the switching circuit is in the off state; and
wherein said monitoring circuit is electrically connected to the relay activating circuit of the normally closed relay, said monitoring circuit supplying activating power to the relay activating circuit so long as a determination is made that said circuit breaker is operating within acceptable disable parameters, and ceasing to supply activating power to the relay activating circuit, thereby tripping said circuit breaker, when either (i) said monitoring circuit determines that said circuit breaker is not operating within the acceptable disable parameters, or (ii) said monitoring circuit becomes inoperable.

7. The circuit breaker of claim 6 wherein said monitoring circuit is electrically connected to said primary trip coil, and wherein said monitoring circuit provides power to said primary trip coil when a determination is made that said circuit breaker is not operating within acceptable trip parameters, thereby causing activation of said primary trip coil and tripping of the circuit breaker.

8. The circuit breaker of claim 6 wherein an input of the switching circuit of said normally closed relay receives power from the main power circuit, downstream of said pair of main contacts, and an output of the switching circuit of said normally closed relay is electrically connected to said secondary trip coil.

9. The circuit breaker of claim 8 wherein said secondary trip coil requires greater power to trip than said secondary trip coil momentarily experiences prior to the switching circuit of the normally-closed relay being switched to its open state when the breaker is either switched to its closed state or when the breaker is first provided power while it is already in an unpowered, closed state.

10. The circuit breaker of claim 8 further comprising a capacitive delay circuit electrically connected in the switching circuit of said normally closed relay.

11. The circuit breaker of claim 6 wherein said normally closed relay comprises a solid state normally closed relay and wherein the relay activating circuit comprises a solid state activating circuit.

12. The circuit breaker of claim 6 wherein said normally closed relay comprises an electro-mechanical normally closed relay and wherein the relay activating circuit comprises an activating coil.

13. The circuit breaker of claim 1 further comprising a sensor electrically disposed in said main power circuit and wherein said monitoring circuit is in electrical communication with said sensor.

14. A circuit breaker comprising:
a pair of main contacts movable with respect to each other between a closed position wherein a line terminal and a load terminal are in electrical communication with each other via a main power circuit, and an open position wherein the line terminal and the load terminal are electrically isolated from each other;
a primary trip coil operably connected to at least one of said pair of main contacts, said primary trip coil being adapted, upon activation, to cause said pair of main contacts to move from the closed position to the open position, thereby tripping said circuit breaker;
a secondary trip coil operably connected to at least one of said pair of main contacts, said secondary trip coil being adapted, upon activation, to cause said pair of main contacts to move from the closed position to the open position, thereby tripping said circuit breaker;
a monitoring circuit monitoring operation of the circuit breaker;
said monitoring circuit being electrically connected to said primary trip coil such that said monitoring circuit provides power to said primary trip coil when a determination is made that said circuit breaker is not operating within acceptable trip parameters, thereby causing activation of said primary trip coil and tripping of the circuit breaker;
a normally closed relay having a relay activating circuit and a switching circuit, the switching circuit defaulting to an on state, but being switchable to an off state when activating power is supplied to the relay activating circuit, the switching circuit automatically returning to the on state when activating power to the relay activating circuit is interrupted;

wherein the switching circuit of said normally closed relay is electrically connected to said secondary trip coil, such that the switching circuit of said normally closed relay provides power to said secondary trip coil when the switching circuit is in the on state, thereby causing activation of said secondary trip coil and tripping of the circuit breaker, but does not provide power to said secondary trip coil when the switching circuit is in the off state; and wherein said monitoring circuit is electrically connected to the relay activating circuit of the normally closed relay, said monitoring circuit supplying activating power to the relay activating circuit so long as a determination is made that said circuit breaker is operating within acceptable disable parameters, and ceasing to supply activating power to the relay activating circuit, thereby tripping said circuit breaker, when either (i) said monitoring circuit determines that said circuit breaker is not operating within the acceptable disable parameters, or (ii) said monitoring circuit becomes inoperable.

15. The circuit breaker of claim 14 wherein said circuit breaker is user resettable if the circuit breaker has been tripped by said primary trip coil, and wherein said circuit breaker is not user resettable if the circuit breaker has been tripped by said secondary trip coil.

16. The circuit breaker of claim 14 wherein an input of the switching circuit of said normally closed relay receives power from the main power circuit, downstream of said pair of main contacts, and an output of the switching circuit of said normally closed relay is electrically connected to said secondary trip coil.

17. The circuit breaker of claim 16 wherein said secondary trip coil requires greater power to trip than said secondary trip coil momentarily experiences prior to the switching circuit of the normally-closed relay being switched to its open state when the breaker is either switched to its closed state or when the breaker is first provided power while it is already in an unpowered, closed state.

18. The circuit breaker of claim 16 further comprising a capacitive delay circuit electrically connected in the switching circuit of said normally closed relay.

19. The circuit breaker of claim 14 further comprising a sensor electrically disposed in said main power circuit and wherein said monitoring circuit is in electrical communication with said sensor.

20. The circuit breaker of claim 14 wherein said normally closed relay comprises a solid state normally closed relay and wherein the relay activating circuit comprises a solid state activating circuit.

21. The circuit breaker of claim 14 wherein said normally closed relay comprises an electro-mechanical normally closed relay and wherein the relay activating circuit comprises an activating coil.

22. The circuit breaker of claim 14 wherein the determination is made that said circuit breaker is not operating within acceptable trip parameters upon detection of at least one of the following: an inrush current above a threshold level and an overcurrent above a threshold level.

23. The circuit breaker of claim 14 wherein the determination is made that said circuit breaker is not operating within acceptable trip parameters upon detection of at least one of the following: a ground fault condition and an arc fault condition.

24. The circuit breaker of claim 14 wherein the determination is made that said circuit breaker is not operating within acceptable disable parameters upon detection of at least one of the following: a malfunction of said primary trip coil and a malfunction within said monitoring circuit.

* * * * *